(12) United States Patent
Krog

(10) Patent No.: US 8,494,813 B2
(45) Date of Patent: Jul. 23, 2013

(54) METHOD OF DESIGNING A COMPOSITE PANEL

(75) Inventor: Lars Krog, Bristol (GB)

(73) Assignee: Airbus Operations Limited, Bristol (GB)

( * ) Notice: Subject to any disclaimer, the term of this patent is extended or adjusted under 35 U.S.C. 154(b) by 1070 days.

(21) Appl. No.: 12/457,445

(22) Filed: Jun. 11, 2009

(65) Prior Publication Data
US 2010/0223029 A1 Sep. 2, 2010

(30) Foreign Application Priority Data
Jun. 24, 2008 (GB) .................................. 0811554.5

(51) Int. Cl.
*G06F 17/50* (2006.01)
(52) U.S. Cl.
USPC ................................................ 703/1; 700/98
(58) Field of Classification Search
USPC .......................................... 703/1, 2, 7; 700/98
See application file for complete search history.

(56) References Cited

U.S. PATENT DOCUMENTS

| 5,984,511 A * | 11/1999 | Vasey-Glandon et al. ......... | 703/6 |
| 6,473,724 B1 * | 10/2002 | Soto ................................... | 703/7 |
| 7,668,701 B2 * | 2/2010 | Meizoso Latova et al. ....... | 703/1 |
| 2007/0244678 A1 * | 10/2007 | Averill et al. .................... | 703/7 |
| 2009/0022945 A1 | 1/2009 | Carpentier et al. | |

FOREIGN PATENT DOCUMENTS

WO  WO 2005/072939  8/2005

OTHER PUBLICATIONS

Gregory A. Wrenn, Augustine R. Dovi, "Multilevel Decomposition Approach to the Preliminary Sizing of a Transport Aircraft Wing" NASA Contractor Report 4296, May 1990, 31 pages.*
Liu, "Two-Level Optimization of Composite Wing Structures Based on Panel Genetic Optimization", *Dissertation* (*University of Florida*, 2001, pp. i-xii and pp. 1-139.
British Search Report for GB 0811554.5 dated Oct. 10, 2008.

* cited by examiner

*Primary Examiner* — Dwin M Craig
(74) *Attorney, Agent, or Firm* — Nixon & Vanderhye P.C.

(57) ABSTRACT

A method of designing a composite panel, the panel comprising a plurality of zones, each zone comprising a plurality of plies of composite material, each ply in each zone having a respective orientation angle, and some of the plies running continuously between adjacent zones. A design is provided comprising a set of design variables including a thickness for each of the zones, and a ply percentage for each orientation angle for each of the zones, each ply percentage identifying a percentage of plies within a zone having a particular orientation angle.
The design is modified in a series of iterations, each iteration including: analyzing the current design by calculating an objective function, a set of ply evolution constraint functions each indicating a degree of ply continuity between a respective pair of adjacent zones, and one or more structural constraint functions; performing a sensitivity analysis by calculating partial derivatives of the objective function for the current design with respect to a selected set of the design variables, and calculating partial derivatives of the constraint functions for the current design with respect to a selected set of the design variables; and generating a new design by determining an optimum update of the design variables in accordance with the analysis and the sensitivity analysis.

10 Claims, 8 Drawing Sheets

METHOD OF DESIGNING A COMPOSITE PANEL

This application claims priority to British Application No. 0811554.5 filed 24 Jun. 2008, the entire contents of which is hereby incorporated by reference.

FIELD OF THE INVENTION

The present invention relates to a method of designing a composite panel

BACKGROUND OF THE INVENTION

FIG. 1 illustrates a traditional engineering design process for designing a composite structure. Such a process will typically consist of some iterative analysis 1 and redesign 2 in which engineering analysis may play a role in suggesting design updates. The iterative re-design process is typically terminated once a satisfactory design is achieved. A satisfactory design could be a minimum weight design satisfying a number of structural performance requirements and composite layout design rules.

Gradient-based numerical optimization offers techniques that allow a systematic search for an optimum design that simultaneously will satisfy multiple design requirements. Such numerical optimization methods are available for solving optimization problems with 1,000's of design variables and 1,000,000's of constraint equations. The solution process is a systematic approach, with a process flow as illustrated in FIG. 2.

The first difference one notices when comparing the processes in FIGS. 1 and 2 is the use of mathematical terms such as sensitivity analysis 3 and convergence 4. This reflects that the treatment of the design problem has been turned into a mathematical problem, which is solved using mathematical programming techniques. It is this mathematical and very systematic treatment of the design problem that makes it possible to solve design optimization problems with 1000's of design variables and 1,000,000's of constraints.

Solving an optimization problem via a gradient-based optimization search process, such as the one illustrated in FIG. 2, requires a number of steps to be performed.

Firstly the current design is analyzed in step 5. Typically in structural optimization a designer is interested in minimizing weight, whilst satisfying a number of strength, buckling and other structural design requirements. The analysis task in step 5 would in this case consist of evaluating current values for an optimization objective function (weight) and constraints (buckling, strength and other structural requirements).

Secondly a so-called design sensitivity analysis is performed in step 3. The design sensitivity analysis consists of a calculation of partial derivatives of the optimization objective and constraint functions with respect to design variable changes. In less mathematical terms—design sensitivities are numbers that tell/predict how the optimization objective and constraint functions will change when design variables are changed. Design sensitivities may be calculated either by analytical differentiation or by numerical approximations such as finite differences.

Having calculated current values of optimization objective functions and constraint functions in step 5, and having calculated design sensitivities in step 3, it is possible to build an approximate design model that predicts the values of both the objective function and all constraint functions after a simultaneous change of multiple design variables. The design models are often built utilizing mathematical approximation schemes that allow an efficient solution of the mathematically formulated design problem. Possibly the simplest approximation scheme is a simple linear model or Taylor series expansion. FIG. 3 shows how a linear approximation 6 can be constructed around a current design point 7. Such a linear prediction would be a reasonable estimation of true function behaviour if we do not take steps which are too large.

Numerical optimization processes may be seen to work by substituting the solution of a "non-linear" optimization problem by the solution of a sequence of approximating optimization problems. Having formulated the approximate design problem a mathematical programming algorithm is used to solve the optimization problem and determine an optimum update of design variables. After this the cycle can start again with another analysis and sensitivity analysis. Typically software for constructing approximate design problems and for solving such problems are integrated into a single package.

Convergence checks (indicated at 4 in FIG. 2) simply consist of checks that tell if the optimization solution process has stopped making progress, if the design has stabilized and if all design constraints are satisfied.

Consider now a method of designing a composite panel, the panel comprising a plurality of zones, each zone comprising a plurality of plies of composite material, each ply in each zone having a respective orientation angle, and some of the plies running continuously between adjacent zones.

Each zone has a laminate ply percentage for each orientation angle which represents the percentage of plies in that zone having that particular orientation angle. Ply continuity is a measure of how many plies run continuously between a given pair of adjacent zones. That is, a pair of zones where all the plies run continuously between the zones have a high degree of ply continuity, whereas a pair of zones where some of the plies are broken or discontinued at the junction between the zones have a low degree of ply continuity.

Clearly if the thickness between zones is varying it will be necessary to remove plies or introduce additional plies. It would be desirable to provide an optimisation formulation which not only allows laminate thickness and laminate ply percentages to be varied across the panel, but which also impose constraints that will maximise ply continuity between adjacent zones.

SUMMARY OF THE INVENTION

A first aspect of the invention provides a method of designing a composite panel, the panel comprising a plurality of zones, each zone comprising a plurality of plies of composite material, each ply in each zone having a respective orientation angle, and some of the plies running continuously between adjacent zones, the method comprising:
  a. providing a design for the composite panel comprising a set of design variables including a thickness for each of the zones, and a ply percentage for each orientation angle for each of the zones, each ply percentage identifying a percentage of plies within a zone having a particular orientation angle;
  b. modifying the design in a series of iterations, each iteration including:
    i. analyzing the current design by calculating an objective indicating a degree of ply continuity between a respective pair of adjacent zones, and one or more structural constraint functions;
    ii. performing a sensitivity analysis by calculating partial derivatives of the objective function for the current design with respect to a selected set of the design variables, and calculating partial derivatives of the constraint functions for the current design with respect to a selected set of the design variables; and iii. generating a new design by determining an optimum update of the design variables in accordance with the analysis in step b.i. and the sensitivity analysis in step b.ii.

A further aspect of the invention provides a method of manufacturing a composite panel, the method comprising designing the panel by the method of the first aspect of the invention, and manufacturing the panel in accordance with the design variables.

Various preferred features of the invention are set out in the dependent claims.

BRIEF DESCRIPTION OF THE DRAWINGS

Embodiments of the invention will now be described with reference to the accompanying drawings, in which.

DETAILED DESCRIPTION OF EMBODIMENT(S)

Figure 4:
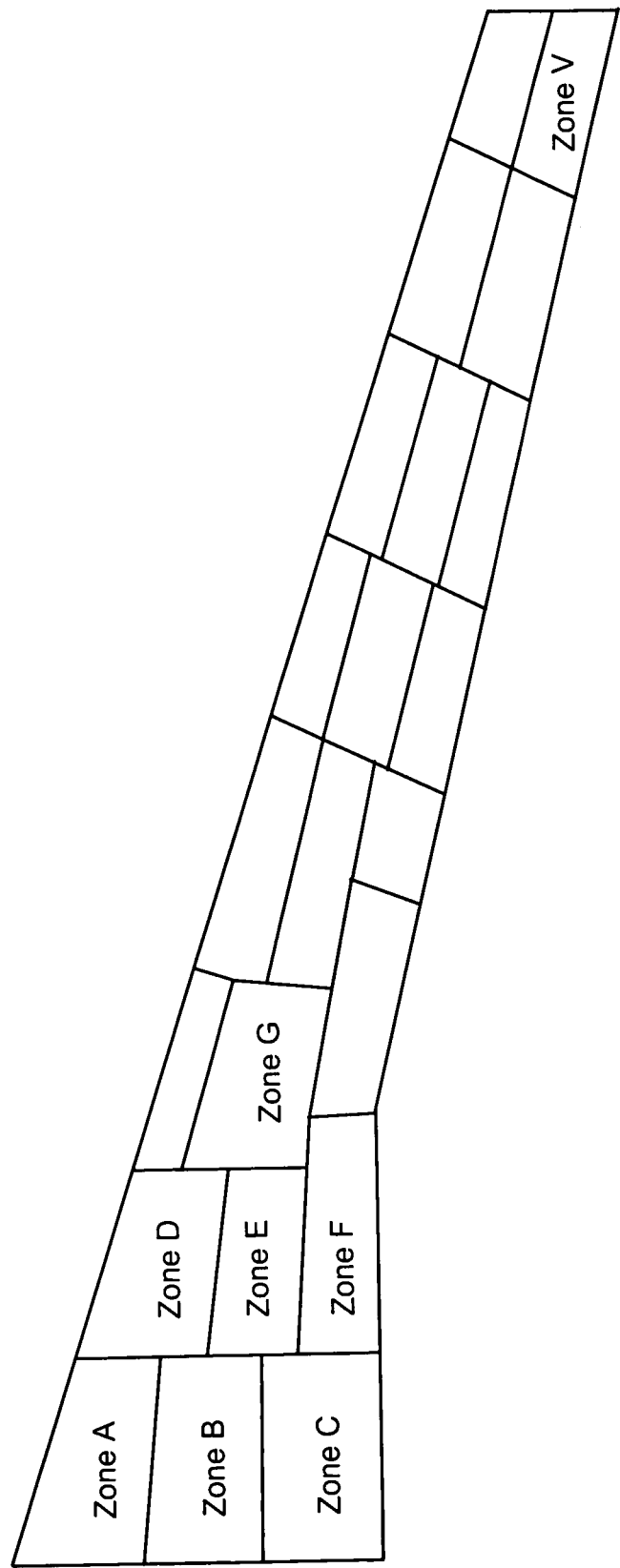
FIG. 4 is a plan view of an aircraft wing skin.
Figure 5:
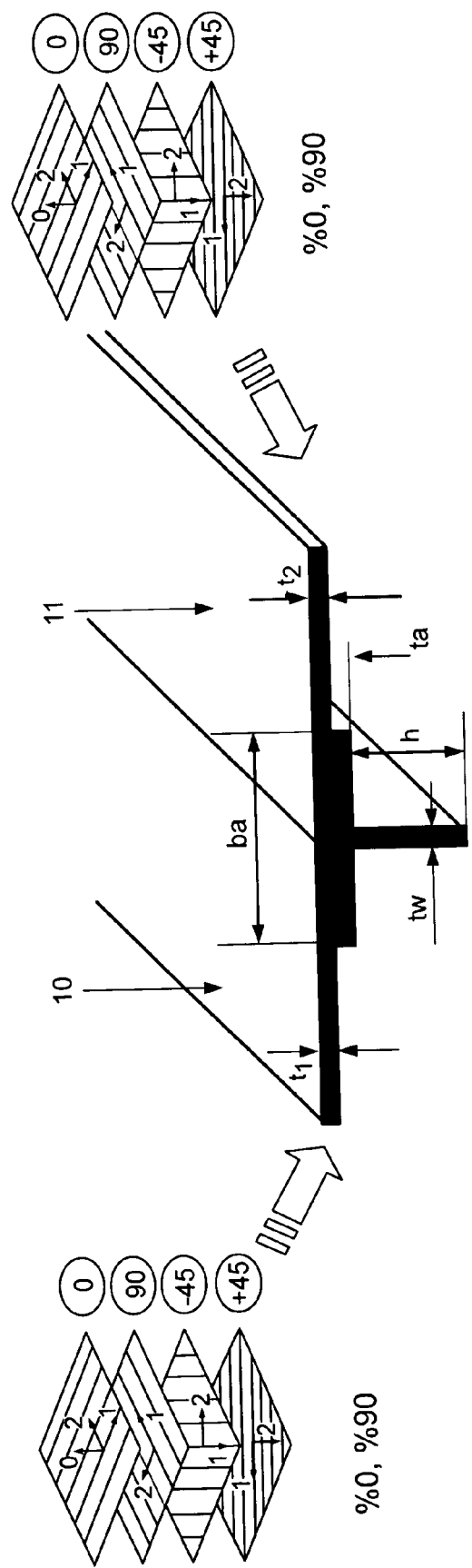
FIG. 5 shows some of the design variables associated with a pair of adjacent zones.

FIG. 4 is a plan view of a composite panel—in this example an upper or lower skin of an aircraft wing. The panel is notionally divided into a plurality of zones A, B, C etc., each having constant laminate thickness and constitution. Ideally the size of such zones should be as small as possible to provide maximum design freedom. An example of two adjacent zones is shown in FIG. 5 and labelled 10, 11. Each zone comprises a plurality of plies of composite material. Each ply comprises a so-called "prepreg"—that is, a plurality of fibres (typically carbon) each running in the same direction and impregnated with a matrix material (typically epoxy resin). The direction of the fibres within a ply defines the orientation angle of the ply. FIG. 5 shows the four possible orientation angles for the plies: 0, 90, −45 and +45. Each zone has a thickness (designated by a design variable labelled $t_1$, $t_2$ in FIG. 5) and a ply percentage identifying a percentage of plies within the zone having a particular orientation angle. FIG. 5 also shows a T-section stringer spanning the two zones. The stringer is defined by a number of design variables h, tw etc.

Both the thickness and the ply percentage are independent design variables which can vary between the zones. Choosing an optimum combination of design variables allows a minimum weight to be achieved, along with achieving sufficient structural strength and buckling resistance. At the same time it is desirable that certain ply-continuity rules are obeyed, which set the following requirements for laminate percentage evolution:

laminate percentages can only be changed between zones by introducing new plies when thickness is increasing or by breaking existing plies when thickness is decreasing it is not acceptable to break existing plies if thickness is increasing or to introduce new plies when thickness is decreasing it is not acceptable to change laminate percentages unless associated with a laminate thickness change.

Figure 6:
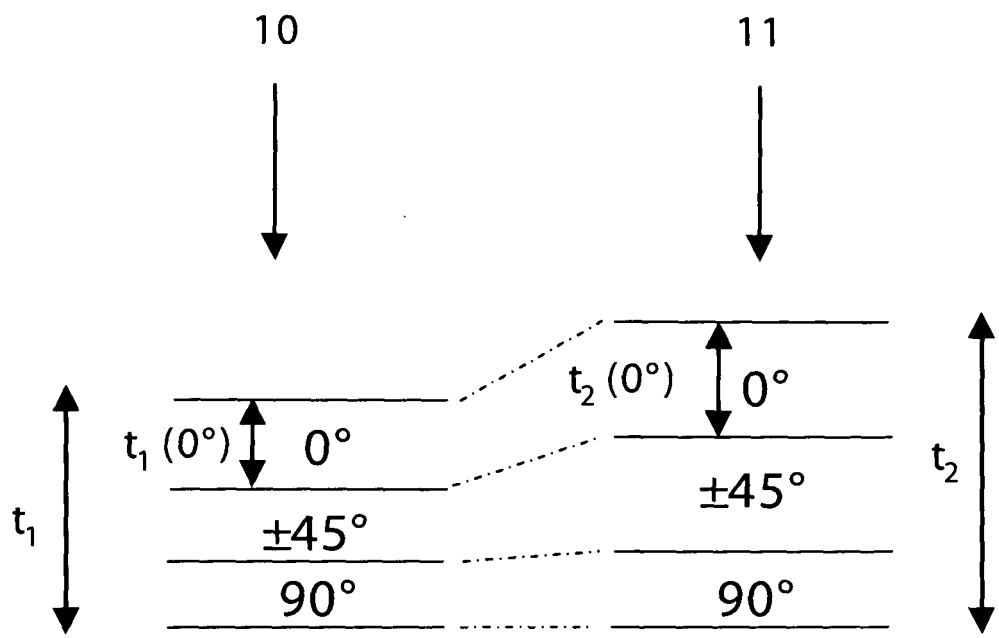
FIG. 6 shows a pair of adjacent zones with increasing thickness and allowable ply evolution.
Figure 7:
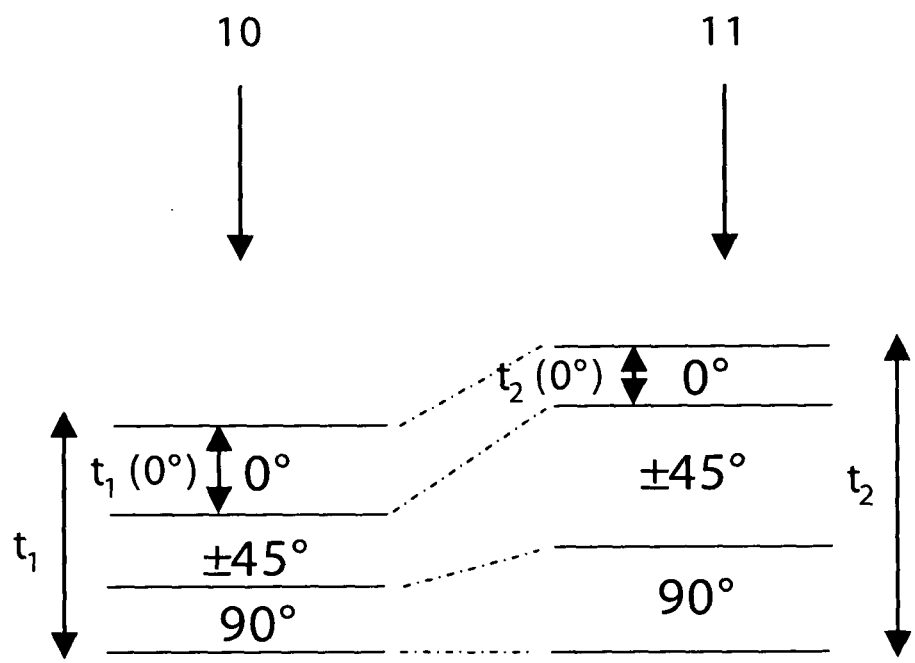
FIG. 7 shows a pair of adjacent zones with increasing thickness and unallowable ply evolution.

FIG. 6 illustrates an acceptable ply percentage evolution scenario for the two adjacent zones 10, 11 and FIG. 7 illustrates an unacceptable ply percentage evolution scenario. Thus in FIG. 6 the thickness is increasing from left to right (that is, $t_2 > t_1$) and so is the thickness for each ply orientation (that is $t_2(0°) > t_1(0°)$, $t_2(90°) > t_1(90°)$ and so on). However in FIG. 7 the thickness is increasing from left to right, but at the same time the thickness of the 0° layer is decreasing (that is, $t_2(0°) < t_1(0°)$). In this situation laminate percentages, moving from left to right in FIG. 7, are not changed simply by introducing new plies. Rather the percentage of ±°45°/90° plies is also increased by exchanging 0° degree plies for ±°45° and 90° plies.

At first sight it would appear that the requirements that must be met are different for situations with increasing or decreasing thickness. Denoting the two adjacent zones 10, 11 as 1/2 respectively, and assigning independent thickness variables $T_1/T_2$ and independent ply percentage variables $P0_1/P0_2$, $P45_1/P45_2$ and $P90_1/P90_2$ it is possible to formulate two set of requirements to be satisfied for increasing/decreasing thickness, as set out below in Table 1:

TABLE 1

| Increasing Thickness | Decreasing Thickness |
| --- | --- |
| $T_2 - T_1 >= 0$ | $T_1 - T_2 >= 0$ |
| $(P0_2 * T_2) - (P0_1 * T_1) >= 0$ | $(P0_1 * T_1) - (P0_2 * T_2) >= 0$ |
| $(P45_2 * T_2) - (P45_1 * T_1) >= 0$ | $(P45_1 * T_1) - (P45_2 * T_2) >= 0$ |
| $(P90_2 * T_2) - (P90_1 * T_1) >= 0$ | $(P90_1 * T_1) - (P90_2 * T_2) >= 0$ |

Figure 1:
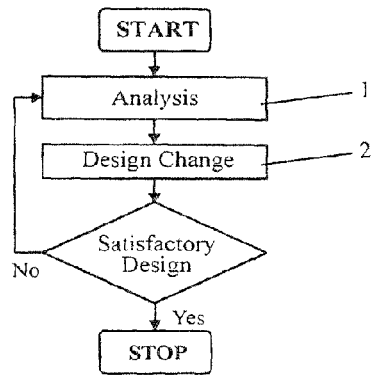
FIG. 1 is a flow diagram of a traditional engineering design process for designing a composite structure.
Figure 2:
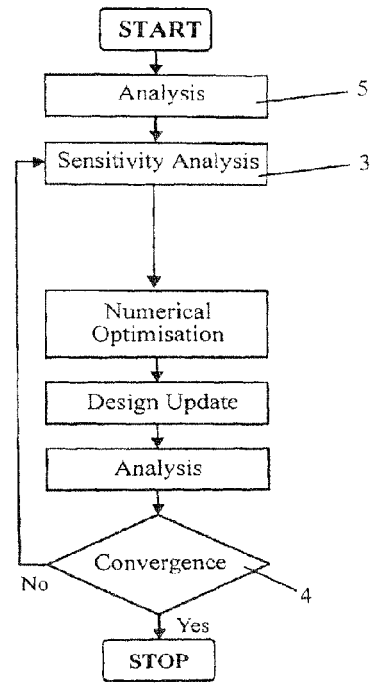
FIG. 2 is a flow diagram of a gradient-based optimization process.
Figure 3:
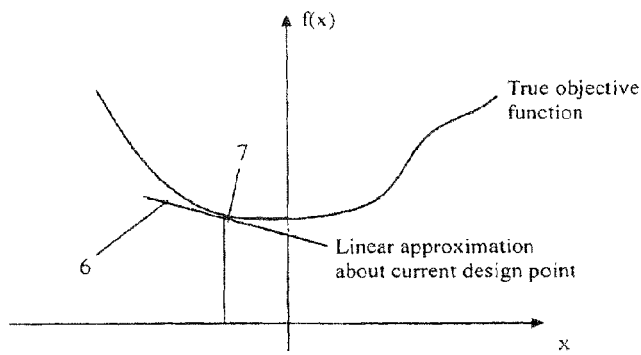
FIG. 3 shows an objective function, and a linear approximation about a current design point.

However it is not possible to apply such dual requirements in a gradient-based optimization process of the kind described in FIG. 2. In the design process of FIG. 1 it would be possible to determine if the two composite layout design rules set forward in Table 1 are satisfied. If not it is a simple matter of making a design adjustment and then re-evaluate weight, structural performance and composite layout rules. However the search for an optimum design is not very structured and it is not given that just engineering judgment will lead to an optimum design when dealing with large structures described by 1000's of design requirements and required to meet 1000.000's of structural and non-structural constraints.

Figure 8:
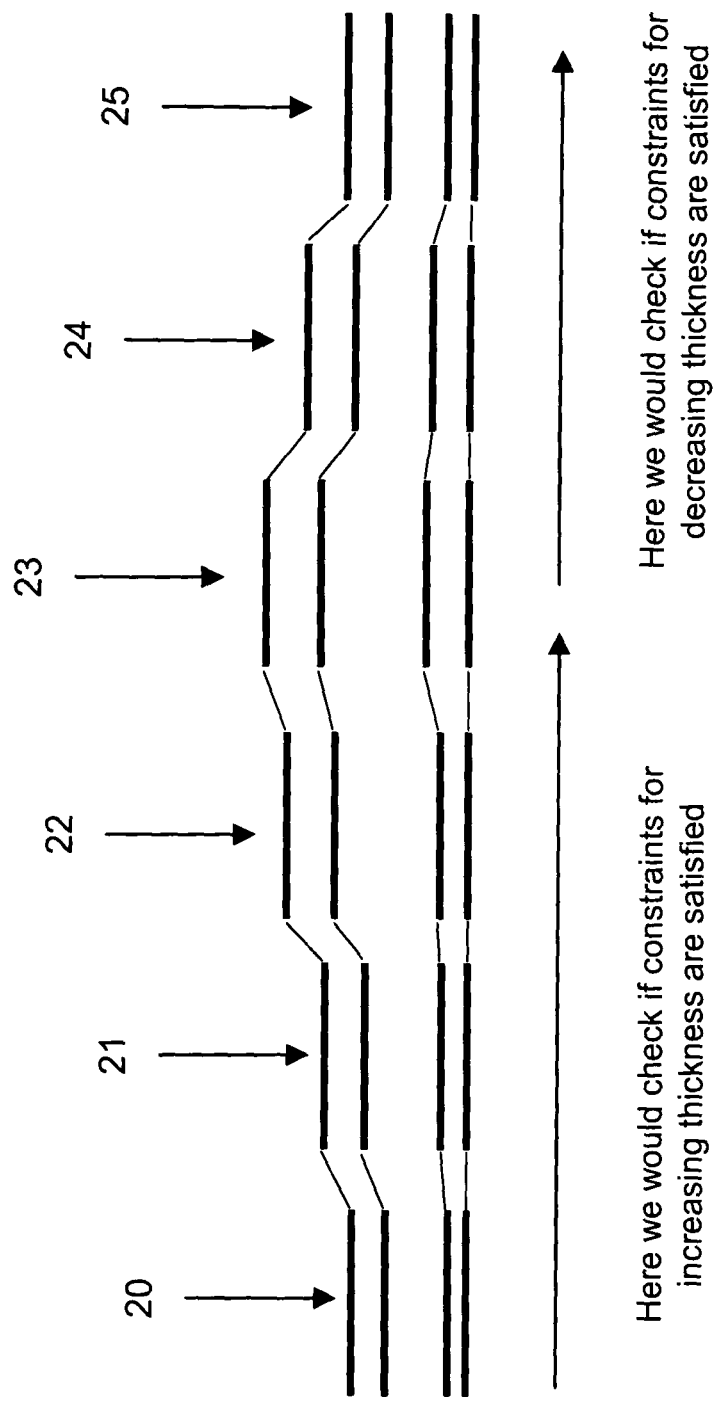
FIG. 8 shows six zones in a composite panel.

Thus for the dual requirements set out in Table 1, depending on the thickness variation in the actual design it would be necessary to check a different set of requirements. This is illustrated in FIG. 8 which shows four zones 20-23 where thickness increases and two zones 24,25 where thickness decreases.

When using an optimization process as shown in FIG. 2, then when formulating the approximate design problem to be solved by the iterative optimization process, it would be necessary to formulate requirements based on what is relevant at a given design point. Thus in a direction where the total laminate thickness is already increasing it would be necessary to formulate constraints to ensure that that the thickness associated with each ply-orientation after a design update is constant or increasing. This would prevent the optimizer from ever changing an area with increasing thickness into an area with decreasing thickness.

Thus it is desirable to formulate a single set of requirements encapsulating requirements for both increasing/decreasing thickness situations. Obtaining a single set of requirements is obtained by realizing that constraints should be formulated in bundle thicknesses (as above) and realizing that the thickness change associated with each ply bundle must follow the overall laminate thickness evolution. In other words: "laminate thickness change"×"bundle thickness change" must always be positive. We now have a single set of lower bound requirements to be satisfied:

$$(T_2-T_1)*((P0_2*T_2)-(P0_1*T_1)) \geq 0$$

$$(T_2-T_1)*((P45_2*T_2)-(P45_1*T_1)) \geq 0$$

$$(T_2-T_1)*((P90_2*T_2)-(P90_1*T_1)) \geq 0$$

Formulating the above set of requirements enables laminate thicknesses and laminate percentages to be optimized whilst satisfying ply continuity constraints and thus enables realistic weight savings to be achieved.

Consider now a simple test case, with a single laminate evolution constraint equation only. Laminate evolution constraints given above are all of the following mathematical form, $$(t_1-t_2)*(t_1p_1^\theta-t_2p_2^\theta) \geq 0$$

Assuming an initial design with 1 and 2 panel thicknesses:

$$t_1=10 \text{ mm}; t_2=8 \text{ mm}$$

and with left and right panel ply percentages:

$$p_1^\theta=0.25; p_2^\theta=0.35$$

Total panel thicknesses are clearly decreasing (going left to right), so in order not to introduce additional plies the thickness associated with the ply orientation θ must be either constant or decreasing. We calculate this thickness for the left and right panel and see that this thickness is increasing from 2.5 mm to 2.8 mm. Thus we do not have a feasible design.

$$t_1p_1^\theta=2.5 \text{ mm}; t_2p_2^\theta=2.8 \text{ mm}$$

If we were to evaluate the value of the design constraint we would obtain:

$$(10 \text{ mm}-8 \text{ mm})*(10 \text{ mm}*0.25-8 \text{ mm}*0.35) \geq 0$$
$$\Leftrightarrow -0.6 \geq 0.0$$

Figure 9:
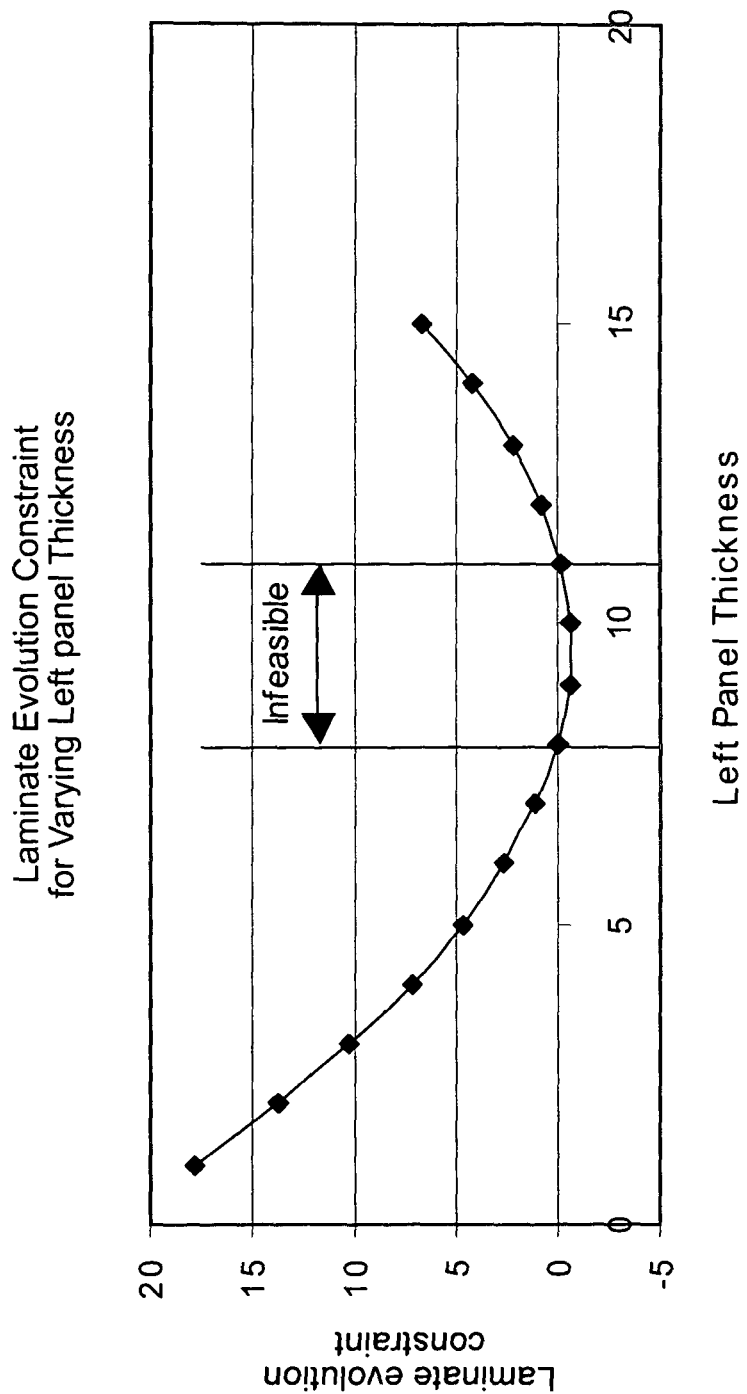
FIG. 9 is a graph of laminate evolution constraint versus left panel thickness.
Figure 10:
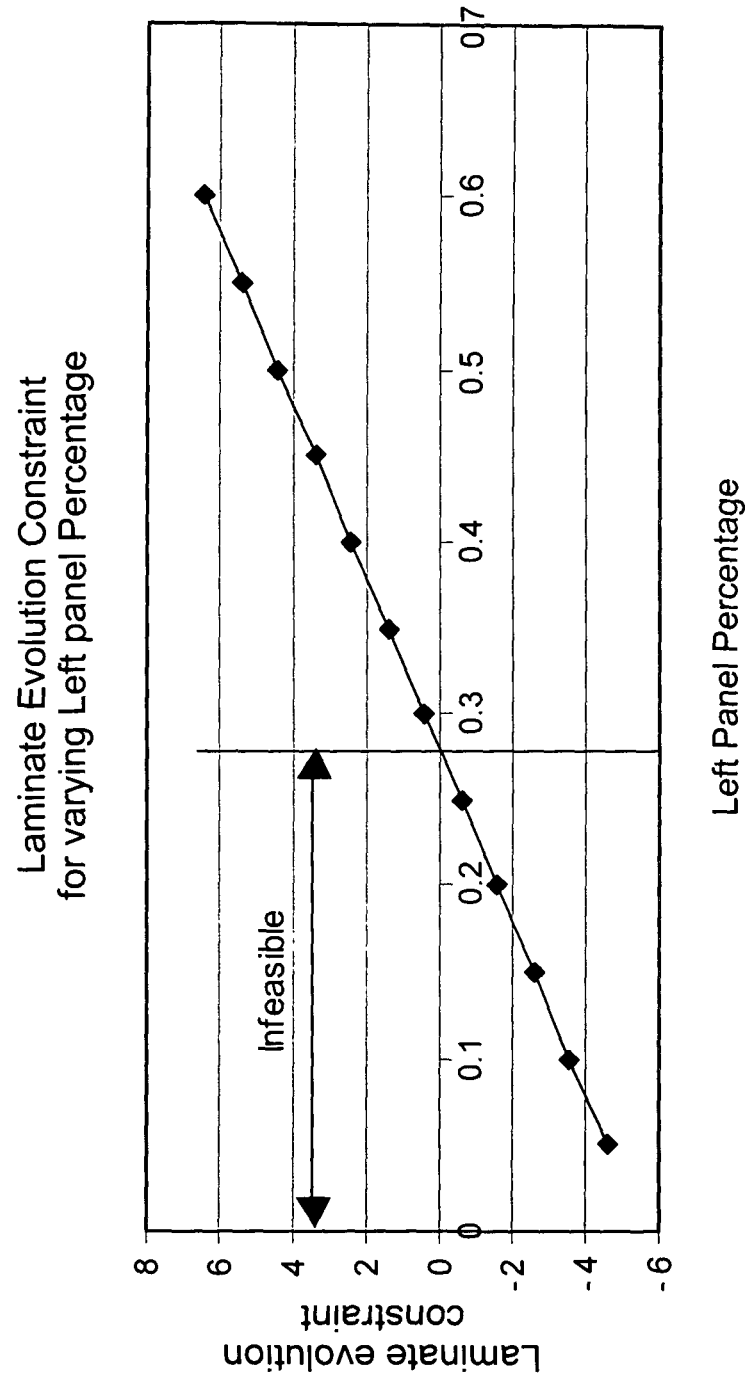
FIG. 10 is a graph of laminate evolution constraint versus left panel percentage.

The constraint equation correctly captures the fact that the constraint is violated. Now let's consider the how the constraint equation could be used to determine feasible areas of the design space. FIGS. 9 and 10 show how the constraint function behaves, taking the above numerical example as a starting point and varying the left panel thickness in FIG. 9, and the left panel ply percentages in FIG. 10.

In FIG. 9 we can see that a left panel thickness between 8 and 11.2 mm is not permitted since the ply evolution constraint function drops below zero. Similarly in FIG. 10 we can see that a left panel ply percentage lower than 0.28 is not permitted since the ply evolution constraint function drops below zero.

From the above it is clear that the two discrete laminate evolution check criteria of Table 1 have been successfully combined into a single criterion, providing a means of simultaneously enforcing both criteria in a mathematical programming approach to design optimization. The suggested function is a smooth and differentiable mathematical function. This enables the function to be used as a constraint function in a gradient-based optimization search process.

Figure 11:
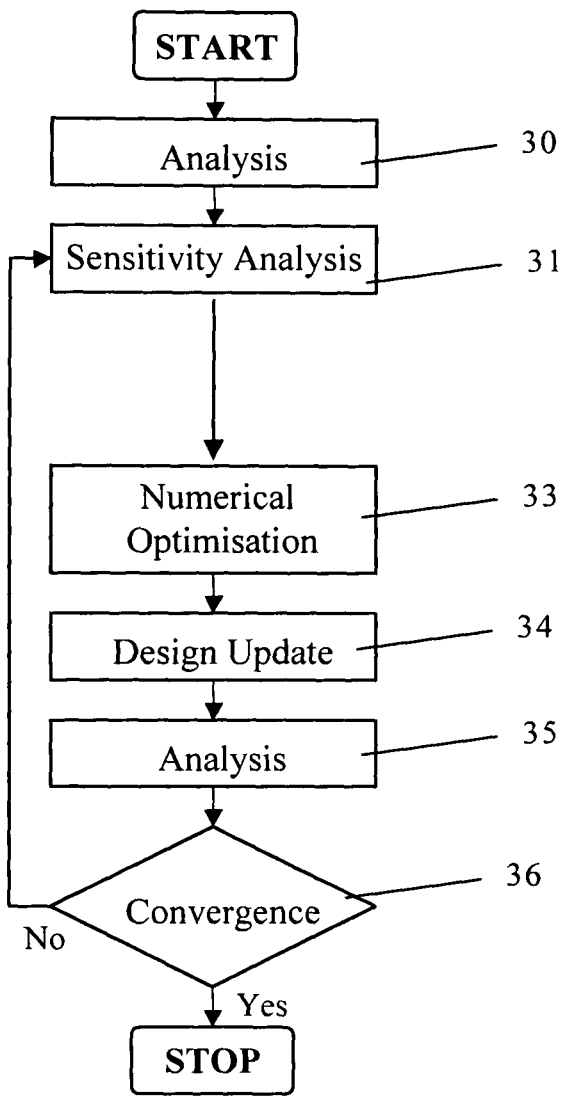
FIG. 11 is a flow diagram of a computer-implemented gradient-based optimization process.

An exemplary method of designing a composite panel using the ply continuity constraints introduced above will now be described with reference to FIG. 11. The panel comprising a plurality of zones, each zone comprising a plurality of plies of composite material, each ply in each zone having a respective orientation angle, and some (but not all) of the plies running continuously between adjacent zones. Firstly, in step 30 an initial design is formulated and analyzed. The initial design comprises a set of design variables including:

a thickness T for each of the zones a ply percentage P0, P45, P90 for each orientation angle for each of the zones, each ply percentage identifying a percentage of plies within a zone having a particular orientation angle optionally, stringer design variables h, tw etc.

The design is analyzed in step 30 to calculate an objective function (for instance the total weight W(a) of the panel), a set of ply evolution constraint functions $RF^{PlyEvol}(a)$ each indicating a degree of ply continuity between a respective pair of adjacent zones, and one or more structural constraint functions. An example of a structural constraint function is $RF^{strength}(a, R^{int}(a))$—strength as a function of design a and internal loads $R^{int}$. Note that ply continuity constraints are imposed between each of the neighbouring zones.

Next, a design sensitivity analysis is performed in step 31. The design sensitivity analysis 31 consists of a calculation of partial derivatives of the optimization objective and constraint functions with respect to design variable changes. Note that in general, partial derivatives are calculated with respect to all design variables, but in some circumstances partial derivatives may be calculated for only a selected subset of the design variables. The design sensitivities tell/predict how the optimization objective and constraint functions will change when design variables are changed. Design sensitivities may be calculated in step 31 either by analytical differentiation or by numerical approximations such as finite differences.

Having calculated current values of optimization objective functions and constraint functions in step 30, and having calculated design sensitivities in step 31, in step 33 a numerical optimization process substitutes the solution of the real "non-linear" optimization problem with the solution of a sequence of approximating optimization problems. The optimization process utilizes mathematical approximation schemes that allow an efficient solution of the mathematically formulated design problem. The simplest approximation scheme is a simple linear model or Taylor series expansion.

The mathematical programming algorithm is used to solve the optimization problem and determine an optimum update of design variables which are updated in step 34. The optimum design update is one which drives the design towards a solution which minimizes the weight objective function whilst ensuring that all constraints are satisfied. After this the cycle can start again with another analysis 35 and sensitivity analysis 31. Typically software for constructing approximate design problems and for solving such problems are integrated into a single package that may also control the iterative optimization process.

A convergence check (step 36) checks if the optimization solution process has stopped making progress, if the design has stabilized and if all design constraints are satisfied. At this point the panel can then be manufactured in accordance with the design variables from the latest iteration.

The process can be summarized as follows. Firstly an optimization problem is formulated:

$$\underset{a_i}{\text{Minimise}} = W(a) \qquad i = 1, \ldots, I$$

$$\text{Subject to: } RF_j^{strength}(a, R^{int}(a)) \geq 1.0 \quad j = 1, \ldots, J$$

$$RF_k^{PlyEvol}(a) \geq 0 \qquad k = 1, \ldots, K$$

$$\underline{a_i} < a_i < \overline{a_i} \qquad i = 1, \ldots, I$$

where $a_i$ is a single design variable;

a is a vector of design variables;

W(a) is the weight as a function of design a;

$RF^{strength}(a, R^{int}(a))$ are strength reserve factors as a function of design a and internal loads $R^{int}$; and $RF^{PlyEvol}(a)$ are Ply Evolution constraints as function of design a.

The constraints $\underline{a_i} < a_i < \overline{a_i}$ on the variables $a_i$ are simple upper lower bounds on design variables, like min/max thickness constraints, or constraints which require that laminate percentage variables must be between 0 and 1.

Secondly, the problem is solved by a gradient-based process, in which an approximation to the above problem is formed and solved considering all design variables simultaneously. Hence, it will be noted that this is a global design approach where the optimiser uses knowledge about the full design, including all constraints, before making a suggestion for an optimal design update.

Although the invention has been described above with reference to one or more preferred embodiments, it will be appreciated that various changes or modifications may be made without departing from the scope of the invention as defined in the appended claims.

The invention claimed is:

1. A method of designing a composite panel, the panel comprising a plurality of zones, each zone comprising a plurality of plies of composite material, each ply in each zone having a respective orientation angle, and some of the plies running continuously between adjacent zones, the method comprising:
   a. providing a design for the composite panel comprising a set of design variables including a thickness for each of the zones, and a ply percentage for each orientation angle for each of the zones, each ply percentage identifying a percentage of plies within a zone having a particular orientation angle;
   b. modifying the design in a series of iterations, each iteration including:
      i. analyzing the current design by calculating an objective function, a set of ply evolution constraint functions each indicating a degree of ply continuity between a respective pair of adjacent zones, and one or more structural constraint functions;
      ii. performing a sensitivity analysis by calculating partial derivatives of the objective function for the current design with respect to a selected set of the design variables, and calculating partial derivatives of the constraint functions for the current design with respect to a selected set of the design variables; and
      iii. generating a new design by determining an optimum update of the design variables in accordance with the analysis in step b.i. and the sensitivity analysis in step b.ii., the above method steps are implemented by a computer.

2. The method of claim 1 wherein the ply evolution constraint function is $(T_1-T_2)*[(P_1*T_1)-(P_2*T_2)]$, where $T_1$ and $T_2$ are the thicknesses of adjacent zones in the current design, and $P_1$ and $P_2$ are the ply percentages of adjacent zones in the current design.

3. The method of claim 1 wherein the ply evolution constraint function is formulated in order to avoid breaking plies between zones except where the thickness is decreasing.

4. The method of claim 1 wherein the ply evolution constraint function is formulated in order to avoid changing laminate percentages between zones unless associated with a thickness change between those zones.

5. The method of claim 1 wherein the structural constraint function comprises a buckling constraint function or a strength constraint function.

6. The method of claim 1 wherein partial derivatives are calculated in step b.ii. with respect to all design variables.

7. The method of claim 1 wherein the ply evolution constraint functions are smooth and differentiable.

8. The method of claim 1 wherein ply evolution constraints are calculated for all neighboring zones in the panel.

9. The method of claim 1 wherein each ply comprises a plurality of fibers, and wherein the direction of the fibers within a ply defines the orientation angle of the ply.

10. A method of manufacturing a composite panel, the method comprising: first designing the panel, said panel comprising a plurality of zones, each zone comprising a plurality of plies of composite material, each ply in each zone having, a respective orientation angle, and some of the plies running continuously between adjacent zones, the designing steps comprising:
   a, providing a design for the composite panel comprising a set of design variables including a thickness for each of the zones, and a ply percentage for each orientation angle for each of the zones, each ply percentage identifying a percentage of plies within a zone having a particular orientation angle;
   b. modifying the design in a series of iterations, each iteration including:
      i. analyzing the current design by calculating an objective function, a set of ply evolution constraint functions each indicating a degree of ply continuity between a respective pair of adjacent zones, and one or more structural constraint functions;
      ii. performing a sensitivity analysis by calculating partial derivatives of the objective function for the current design with respect to a selected set of the design variables, and calculating partial derivatives of the constraint functions for the current design with respect to a selected set of the design variables; and
      iii. generating a new design by determining an optimum update of the design variables in accordance with the analysis in step b.i. and the sensitivity analysis in step b.ii; and
   second, manufacturing the panel in accordance with the design variables.

* * * * *